Dec. 9, 1924.
A. C. VAN HOOYDONK
1,518,168
TROLLEY WHEEL
Filed Aug. 11, 1922
2 Sheets—Sheet 1
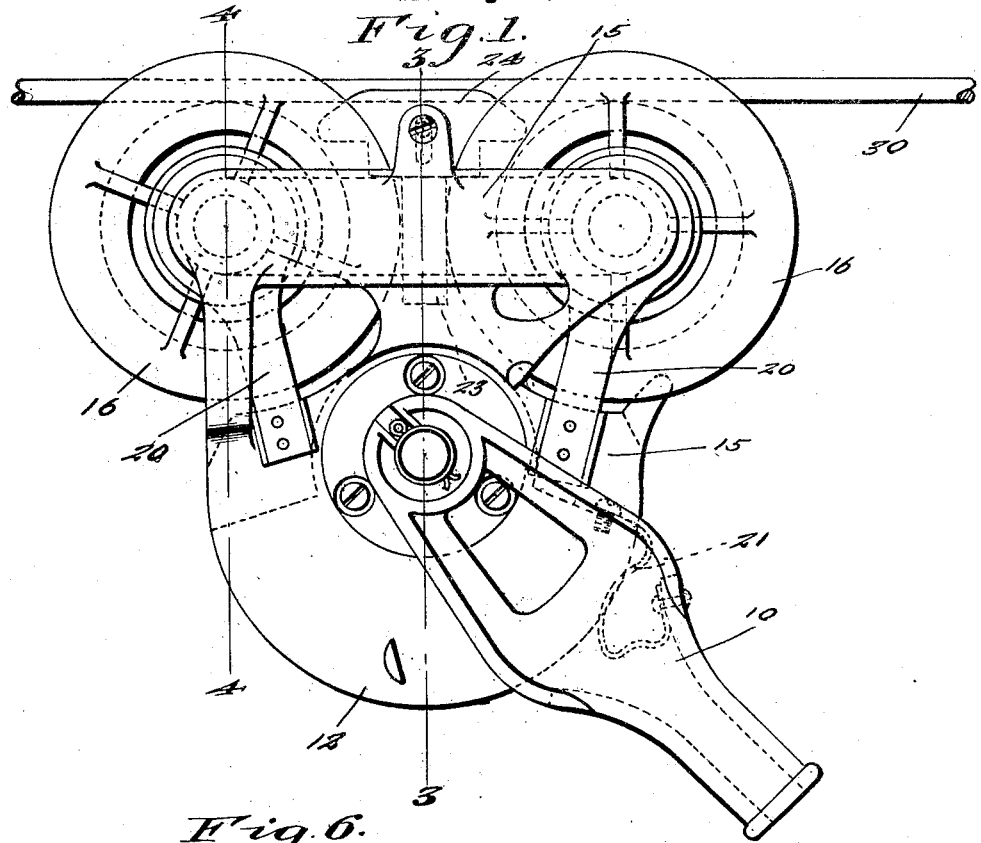
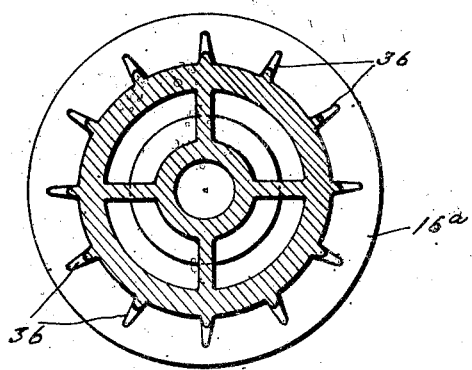
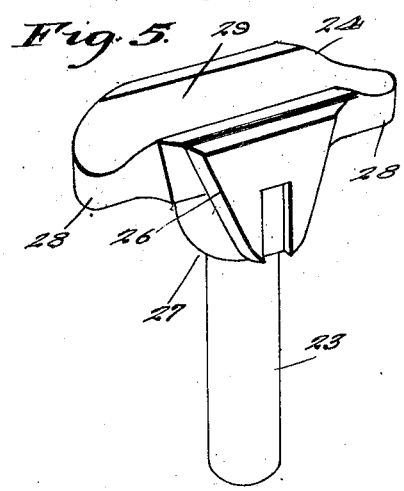
A. C. Van Hooydonk INVENTOR
BY Victor J. Evans
ATTORNEY Dec. 9, 1924.  1,518,168
A. C. VAN HOOYDONK
TROLLEY WHEEL
Filed Aug. 11, 1922   2 Sheets-Sheet 2
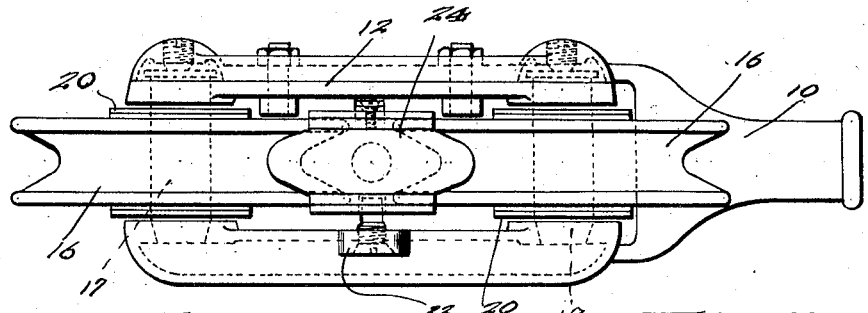
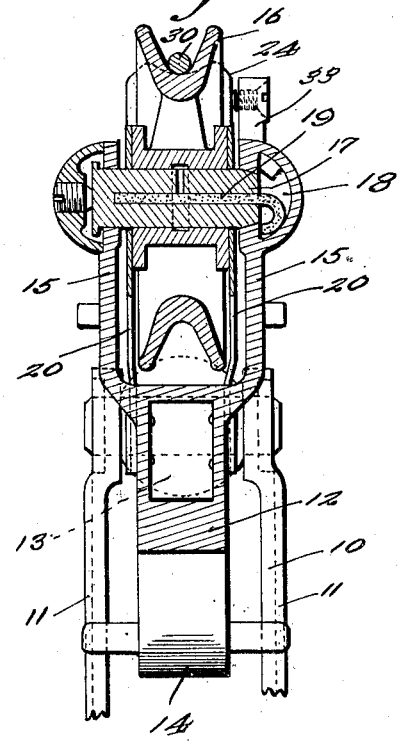
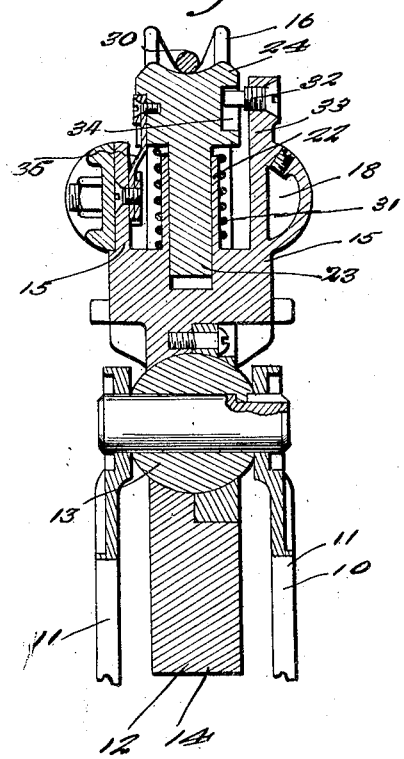
A. C. Van Hooydonk INVENTOR
BY Victor J. Evans
ATTORNEY
WITNESSES Patented Dec. 9, 1924.

1,518,168

UNITED STATES PATENT OFFICE.

ADRIAN C. VAN HOOYDONK, OF MONROE, MICHIGAN.

TROLLEY WHEEL.

Application filed August 11, 1922. Serial No. 581,195.

*To all whom it may concern:*

Be it known that I, ADRIAN C. VAN HOOYDONK, a subject of the Queen of Holland, residing at Monroe, in the county of Monroe and State of Michigan, have invented new and useful Improvements in Trolley Wheels, of which the following is a specification.

This invention relates to improvements in trolley wheels and is an improvement upon a construction for which patent numbered 1,444,716 was granted to me Feb. 6, 1923.

Like that of the patent mentioned, the present invention has for an object the provision of a trolley wheel which will maintain a perfect and relatively large contacting engagement with the trolley wire at all times and under various conditions, so as to eliminate objectionable sparking and consequent burning and damage to the wire.

The present invention however, has for its principal object the provision of means for increasing the electrical contact surface between the trolley wheel and trolley wire, without materially increasing the friction and for this purpose there is provided a contact shoe having a sliding and yielding contact with the wire, friction between this shoe and wire however being reduced to a minimum by locating the shoe between spaced wheels which engage the wire and provide a rolling contact for relieving the tension of the springs of the trolley stand. The shoe is thus permitted a free sliding engagement along the wire, so that a heavy duty collector is provided which will conduct a greater supply of current with as little friction as possible.

With the above and other objects in view, the invention further includes the following novel features and details of construction, to be hereinafter more fully described, illustrated in the accompanying drawings and pointed out in the appended claims.

In the drawings:—

Figure 1 is a side elevation of a trolley wheel constructed in accordance with the invention.

Figure 2 is a top plan view of the same.

Figure 3 is a section on the line 3—3 of Figure 1.

Figure 4 is a similar view on the line 4—4 of Figure 1.

Figure 5 is a detail perspective view of the contact shoe.

Figure 6 is a sectional view of a modified form of wire engaging wheel.

Referring in detail to the drawings, like characters of reference denote corresponding parts throughout the several views.

The construction disclosed in the present application is practically the same as that disclosed in the pending application above mentioned, except that additional contact means is provided for engagement with the trolley wire. There is therefore illustrated a harp 10, which is adapted to be secured to the outer end of a trolley pole in the usual or any preferred manner, the said pole being mounted upon a suitable trolley stand. The harp includes spaced parallel arms 11, between which there is mounted a cage or carrier 12 having a ball and socket connection 13 with the arms of the harp. This cage or carrier is preferably in the form of a casting and includes a weight 14 which is disposed below the ball and socket connection and acts to maintain the carrier in proper operative position. The top of the cage or carrier 12 includes spaced plates or arms 15, between which are mounted trolley wheels 16, the said wheels rotating upon bearing pins 17 which are lubricated from oil reservoirs 18, by means of wicks 19. The bearing pins pass through the outer ends of conductor strips 20, whose inner ends are secured to the cage or carrier 12 so as to insure proper electrical connection, while a flexible conductor element 21 insures a proper electrical connection between the cage or carrier 12 and the harp 10.

All of the foregoing referred to construction is similar to my pending application numbered 560,349, except the last mentioned conductor 21 and it is not believed necessary to enter into a lengthy detailed description of the various parts.

In the present invention, the cage or carrier 12 is provided with a socketed extension 22, which extends upwardly between the trolley wheels 16, and which is designed to receive the shank 23 of a contact shoe 24. The shoe 24 is shown in detail in Figure 5 of the drawings and includes a head 26 which has at its lower end a shoulder 27. The head further includes opposite extensions 28, whereby a relatively long concaved bearing surface 29 is provided, which bearing surface is designed to have a sliding contact with the trolley wire 30. For the